UNITED STATES PATENT OFFICE.

RAYMOND L. DOLLINGS, OF WYOMING, OHIO.

ARTICLE OF FOOD AND METHOD OF PRODUCING SAME.

1,039,912.

No Drawing.

Specification of Letters Patent.

Patented Oct. 1, 1912.

Application filed February 16, 1912. Serial No. 677,997.

*To all whom it may concern:*

Be it known that I, RAYMOND L. DOLLINGS, a citizen of the United States, residing at Wyoming, in the county of Hamilton and State of Ohio, have invented certain new and useful Improvements in Articles of Food and Method of Producing Same, of which the following is a specification.

My invention relates to an improved article of food and the art or method of producing the same.

One of its objects is to provide an improved article of food of novel texture, quality and taste.

Another object is to provide an article of food having novel characteristics and adapted to be used in a variety of different ways by itself and in combination with other articles of food.

My invention in addition to the article itself comprises an order and sequence of procedure in its production; all of which will be fully set forth in the following description and the novel features specifically set forth in the claims.

My improved article of food is a porous and pulverulent article or product, prepared from cereals, preferably by the following method. A dough composed chiefly of wheat flour and water to which yeast is added is prepared of a consistency which may be termed "soft dough." The dough thus prepared and worked until of uniform texture is rolled into a comparatively thin sheet, say from one fourth to three eighths of an inch in thickness, and cut into pieces of convenient size for further treatment. The pieces or strips of dough are spread out, preferably in a single layer, say upon boards, pans, or similar articles and allowed to remain at a temperature favorable for the development of the yeast plants, until due to the yeast the dough has assumed the desired consistency, porosity, or lightness. This step may require from fifteen to sixty minutes. As soon as the strips of dough have reached the desired condition of porosity or lightness they are plunged into boiling water or steam and left a sufficient length of time for all parts of the pieces to have become cooked, or raised to the boiling point of water. A boiling mild solution of caustic soda or potash in water is preferably employed. The pieces are then removed, drained and immediately subjected to the heat of an oven where they are baked. The pieces when removed from the oven are dry or crusted upon the exterior, but are still soft and contain considerable moisture in the interior. The pieces are next subjected to a drying or toasting heat, say approximately that of boiling water, until thoroughly dry. The pieces are then subjected to a crushing or pulverizing operation whereby they are reduced to a granular condition resembling meal.

Care is exercised in the baking operation so as not to discolor the product by over heating. Corn meal and flour other than wheat may be employed in limited proportions if desired. Salt in quantity to be distinctly perceptible to the taste is preferably added and evenly incorporated, and may be added at any stage after the boiling operation. The article or product, either with or without the addition of salt, has a characteristic taste or flavor, and the granules are crisp and porous, and when properly packed remain crisp for long periods.

The article is particularly nutritious and appetizing, and is adapted to be employed by itself, and in combination with other food articles in a great variety of different ways.

The article and the art or method herein described are capable of considerable modification without departing from the principle of my invention.

Having described my invention, what I claim is:

1. A method of preparing an article of food comprising successively boiling, baking, drying, and granulating a porous dough.

2. A method of preparing an article of food comprising successively boiling, baking, drying and granulating a soft porous dough.

3. A method of preparing an article of food comprising successively boiling, baking, drying, and granulating a soft yeast dough.

4. A method of preparing an article of food comprising successively boiling, baking, drying and granulating a yeast dough.

5. A method of preparing an article of food comprising forming a yeast dough, allowing the dough to rise, subjecting the dough to boiling temperature, baking the product of the boiling operation, drying the product of the baking operation, and finally granulating the product of the drying operation.

6. A method of preparing an article of food comprising forming a porous dough, subjecting said porous dough to a boiling temperature, baking the product of the boiling operation, and granulating the product of the baking operation.

7. A method of preparing an article of food comprising forming a soft dough containing yeast, allowing the dough to rise, subjecting the dough to boiling temperature, baking the product of the boiling operation, and finally granulating the product of the baking operation.

8. A method of preparing an article of food comprising preparing a yeast dough in pieces of suitable size and thickness allowing the dough to rise, subjecting the dough to boiling temperature, baking the product of the boiling operation, drying the product of the baking operation, and finally granulating the product of the drying operation.

9. A method of preparing an article of food comprising successively boiling, baking, and granulating a porous dough, with addition of salt subsequent to the boiling operation.

10. A method of preparing an article of food comprising successively boiling, baking, drying and granulating a porous dough.

11. A method of preparing an article of food comprising successively boiling, in an alkaline solution, baking, and granulating a porous dough.

12. A method of preparing an article of food comprising successively boiling in an alkaline solution, baking, drying, and granulating a porous dough.

13. A granular and porous food product prepared from cereal flour and having a characteristic texture and flavor resulting from boiling, then baking, and subsequently toasting.

14. A crisp granular porous food product prepared from cereal flour with the addition of salt, and having a characteristic texture and flavor resulting from boiling, then baking, and subsequently toasting.

15. A granular food product prepared from cereal flour and having a characteristic texture and flavor resulting from boiling in an alkaline solution, and then baking.

16. A granular and porous food product prepared from cereal flour and having a characteristic texture and flavor resulting from boiling in an alkaline solution, then baking, and subsequently toasting.

In testimony whereof I have affixed my signature in presence of two witnesses.

RAYMOND L. DOLLINGS.

Witnesses:
STANLEY M. ADAMS,
C. W. MILES.